United States Patent
Futamura et al.

(10) Patent No.: US 8,277,361 B2
(45) Date of Patent: Oct. 2, 2012

(54) CONTROL APPARATUS FOR TRANSMISSION

(75) Inventors: Suguru Futamura, Toyohashi (JP); Ryutaro Hosoya, Hino (JP); Satoru Sibata, Hino (JP)

(73) Assignees: Aisin Seiki Kabushiki Kaisha, Kariya-Shi, Aichi-Ken (JP); Hino Motors, Ltd., Hino-Shi, Tokyo (JP)

( * ) Notice: Subject to any disclaimer, the term of this patent is extended or adjusted under 35 U.S.C. 154(b) by 811 days.

(21) Appl. No.: 12/361,141

(22) Filed: Jan. 28, 2009

(65) Prior Publication Data
US 2009/0192020 A1    Jul. 30, 2009

(30) Foreign Application Priority Data

Jan. 29, 2008 (JP) ................................ 2008-017649

(51) Int. Cl.
| | |
|---|---|
| H02P 17/00 | (2006.01) |
| F16H 59/60 | (2006.01) |
| F16H 59/62 | (2006.01) |
| F16H 59/48 | (2006.01) |
| G06F 7/00 | (2006.01) |
| G06F 17/00 | (2006.01) |
| G06F 19/00 | (2006.01) |
| G06F 7/70 | (2006.01) |

(52) U.S. Cl. ............ 477/15; 477/97; 477/120; 477/904; 701/62; 701/70
(58) Field of Classification Search ...... 477/15, 477/120, 97, 904; 701/55, 56, 62, 70
See application file for complete search history.

(56) References Cited

U.S. PATENT DOCUMENTS
5,428,531 A * 6/1995 Hayafune ....................... 701/65
5,474,508 A   12/1995 Kondo et al.
2002/0058569 A1 5/2002 Ishiguro et al.

FOREIGN PATENT DOCUMENTS
| JP | 61-206860 A | 9/1986 |
|---|---|---|
| JP | 62037577 A * | 2/1987 |
| JP | 64-6132 U | 1/1989 |
| JP | 3-244872 A | 10/1991 |

(Continued)

OTHER PUBLICATIONS

Translation of JP62037577A, dated Jan. 17, 2012.*

(Continued)

*Primary Examiner* — Tisha Lewis
(74) *Attorney, Agent, or Firm* — Buchanan Ingersoll & Rooney PC

(57) ABSTRACT

A control apparatus of a transmission for a vehicle, which includes an electric generator provided between an engine and the transmission and regenerating electricity when torque is transmitted from a drive shaft of the vehicle via the transmission in a braking condition, includes a releasing speed measuring unit, an up-shifting operation allowing unit and an up-shifting operation restraining unit. The releasing speed measuring unit measures a releasing speed of an accelerator pedal. The up-shifting operation allowing unit is applied to allow an up-shifting operation under the accelerator pedal being released when a releasing speed of the accelerator pedal is lower than a first threshold value. The up-shifting operation restraining unit is applied to restrain the up-shifting operation under the accelerator pedal being released when the releasing speed of the accelerator pedal is equal to or lower than the first threshold value.

14 Claims, 5 Drawing Sheets

FOREIGN PATENT DOCUMENTS

| | | |
|---|---|---|
| JP | 3-282051 A | 12/1991 |
| JP | 6-34033 A | 2/1994 |
| JP | 7-322410 A | 12/1995 |
| JP | 8-135783 A | 5/1996 |
| JP | 9-144873 A | 6/1997 |
| JP | 11-166616 A | 6/1999 |
| JP | 2001-289318 A | 10/2001 |
| JP | 2002-130466 A | 5/2002 |

OTHER PUBLICATIONS

Office Action (Reasons) dated Jan. 24, 2012, issue by the Japanese Patent Office in the corresponding Japanese Patent Application No. 2008-017649 and an English Translation of Office Action. (6 pages).

* cited by examiner

CONTROL APPARATUS FOR TRANSMISSION

CROSS REFERENCE TO RELATED APPLICATIONS

This application is based on and claims priority under 35 U.S.C. §119 to Japanese Patent Application 2008-017649, filed on Jan. 29, 2008, the entire content of which is incorporated herein by reference.

FIELD OF THE INVENTION

The present invention generally relates to a control apparatus for a transmission.

BACKGROUND

As an example, JP07-322410A (hereinafter, referred to as reference 1) discloses a vehicle structure including an electric generator for regenerating electricity. According to the reference 1, the electric generator (serving as an auxiliary braking device and an auxiliary driving device) is provided between an internal combustion engine and a transmission (automated transmission). Further, in a condition where torque is transmitted to the electric generator from a drive shaft via the transmission when a braking operation is performed, the electric generator regenerates electricity.

According to the reference 1, in a condition where the braking operation (operation for releasing an accelerator) is performed when the vehicle is driven under an operational state (ON-state) of the accelerator, a motor is used as the electric generator (the auxiliary braking device). The torque is transmitted to the electric generator via the transmission. Therefore, in a speed-changing period in which a clutch is partially engaged or released until speed changing is completed, torque transmission from the drive shaft to the electric generator may be difficult. Further, the amount of the torque regenerated by the electric generator varies as often as the speed changing is performed in association with the amount of battery charge. Accordingly, the control of the speed changing may be difficult. Therefore, the electricity generation is difficult in the speed-changing period.

FIG. 5 illustrates a speed shift stage selecting map (speed shifting map), which is provided at a control apparatus of the transmission and is employed for determining whether or not the speed shift is required on the basis of an accelerator opening degree (a throttle opening degree) and vehicle speed. For example, when the accelerator releasing operation is performed in a condition where the vehicle is driven at a third speed stage with a constant accelerator opening degree (a constant throttle opening degree) as indicated with a point "a" in FIG. 5, the accelerator opening degree is reduced to across an up-shifting operation control line (a continuous line) 3-4. Consequently, the control apparatus for the transmission determines to conduct an up-shifting operation. In a condition where an operator (driver of the vehicle) continues to drive the vehicle even while the accelerator releasing operation is performed, the control apparatus for the transmission may maintain the speed stage (a fourth speed stage) established by performing the up-shifting operation (as indicated with a point "b1"). However, in a condition where the accelerator is largely returned (released) and the throttle opening degree is thereby largely reduced (as indicated with a point "b2"), for example by an intention of the operator to brake the vehicle, at least two consecutive speed changes (one is from the third speed to fourth speed, and the other is from the fourth speed to third speed) are performed. More specifically, in such a condition, after the throttle opening degree is reduced across the up-shifting operation control line 3-4, the up-shifting operation to change the vehicle speed from the third speed to the fourth speed is performed, while the vehicle speed is reduced across a downshift operation control line (a dotted line) 4-3 (as indicated with a point "c"), thereby reducing the vehicle speed from the fourth speed to the third speed. Thus, because of the plural amounts of the speed changing, the electricity is not regenerated efficiently.

A need thus exists for a control apparatus for an automated transmission which is not susceptible to the drawback mentioned above.

SUMMARY OF THE INVENTION

According to an aspect of the present invention, a control apparatus of a transmission for a vehicle, which includes an electric generator provided between an engine and the transmission and regenerating electricity when torque is transmitted from a drive shaft of the vehicle via the transmission in a braking condition, includes a releasing speed measuring unit, an up-shifting operation allowing unit and an up-shifting operation restraining unit. The releasing speed measuring unit measures a releasing speed of an accelerator pedal. The up-shifting operation allowing unit is applied to allow an up-shifting operation under the accelerator pedal being released when a releasing speed of the accelerator pedal is lower than a first threshold value. The up-shifting operation restraining unit is applied to restrain the up-shifting operation under the accelerator pedal being released when the releasing speed of the accelerator pedal is equal to or lower than the first threshold value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
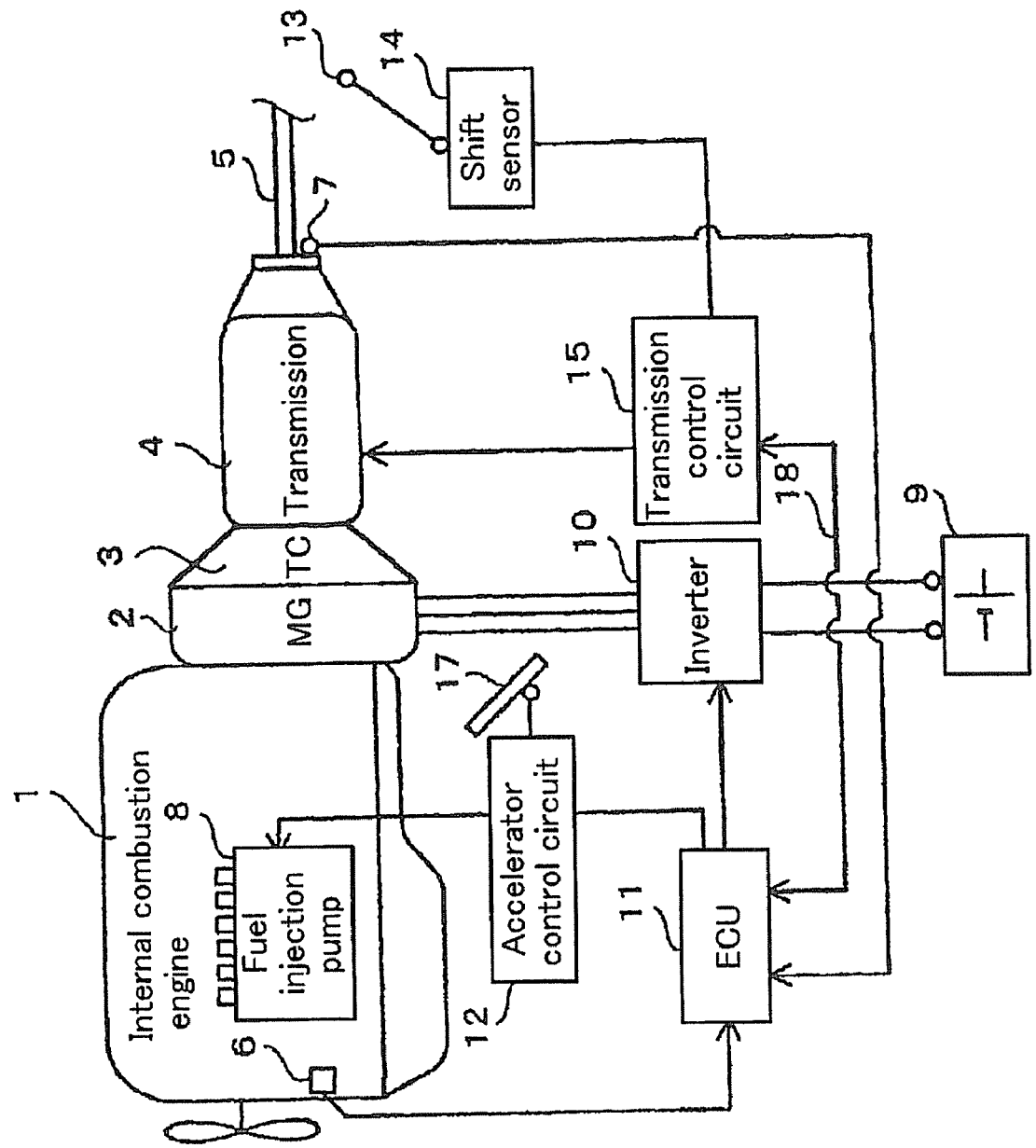
FIG. 1 is a schematic view illustrating a structure of a vehicle including a control apparatus for a vehicle, according to an embodiment of the present invention.

An embodiment of the present invention will be described hereinafter with reference to the attached drawings. As illustrated in FIG. 1, a system of a vehicle includes an internal combustion engine (hereinafter, referred to as engine) 1, an electric generator (motor generator MG) 2, a transmission 4 and an output shaft 5. The engine 1 and the electric generator 2 are serially connected to each other. The vehicle is driven by the engine 1 and the electric generator 2 via the transmission 4 and the output shaft 5.

A diesel engine or a gasoline engine may be employed as the engine 1 as non-limiting examples. An output rotational shaft of the engine 1 is fixedly connected to a rotational shaft of the electric generator 2.

The electric generator 2 includes a three-phase AC rotary mechanism. A rotational output shaft of the electric generator 2 is connected to an input shaft of the transmission 4 via a torque converter (TC) 3 having a lockup clutch mechanism.

The transmission 4 changes the torque inputted from the engine 1 and the electric generator 2 by selecting speed shift stages. Then, the transmission 4 transmits the rotational torque to a reduction gear and a differential gear, which are provided at a vehicle shaft, via the output shaft 5.

An inverter 10 converts direct current supplied from terminals of a battery 9 to a three-phase alternating current and then supplies the three-phase alternating current to field windings of the electric generator 2.

An ECU (electronic control unit) 11 is structured with a computer and a program thereof. In response to outputs from a rotational sensor 6 of the engine 1 and from an output shaft rotational sensor (vehicle speed sensor) 7 provided at the output shaft 5 and to a stroke amount (serving as a depressing amount) of an accelerator pedal 17 outputted by an accelerator sensor provided at the accelerator pedal 17, the ECU 11 outputs a command based on a vehicle condition and an intention of an operator of the vehicle to the inverter 10, an accelerator control circuit 12 and a transmission control circuit 15. For example, the ECU 11 controls AC output phase (or frequency) of the inverter 10 and performs an actuation control and an electricity regeneration control of the electric generator 2.

The accelerator control circuit 12 controls a fuel injection pump 8 on the basis of the command outputted from the ECU 11. Thus, the accelerator control circuit 12 controls the amount of fuel supplied to the engine 1.

A shift sensor 14 detects a position of a shift lever 13 and outputs the detected result to the transmission control circuit 15.

The transmission control circuit 15 includes a speed shift stage selecting map A (see FIG. 4) and a speed shift stage selecting map B (see FIG. 3) in a memorizing unit thereof. Further, the transmission control circuit 15 controls the transmission 4 on the basis of the throttle opening degree and vehicle speed, which are inputted from the ECU 11 via a bus 18, and a shift position which is inputted from the shift sensor 14. As will be described below in detail, the transmission control circuit 15 serves as an up-shifting operation allowing unit with reference to the speed shift stage selecting map B (FIG. 3) and also serves as an up-shifting operation restraining unit with reference to the speed shift stage selecting map A (FIG. 4).

Next, an operation of the vehicle system will be described hereinafter. When the engine 1 is actuated by an ignition operation and the shift lever 13 is set in one of front drive shift positions, the transmission control circuit 15 sends a command (a signal) to the transmission 4 to set a starting gear of the transmission 4.

Next, when the operator presses the accelerator pedal 17, the combustive amount of the fuel supplied to the engine 1 is increased, thereby increasing a rotational speed of the output rotational shaft of the engine 1. The torque outputted by the engine 1 is transmitted to the transmission 4 through the torque converter 3 having the lockup clutch mechanism. Thus, the vehicle starts traveling at a speed shift stage established by the starting gear of the transmission 4.

Figure 3:
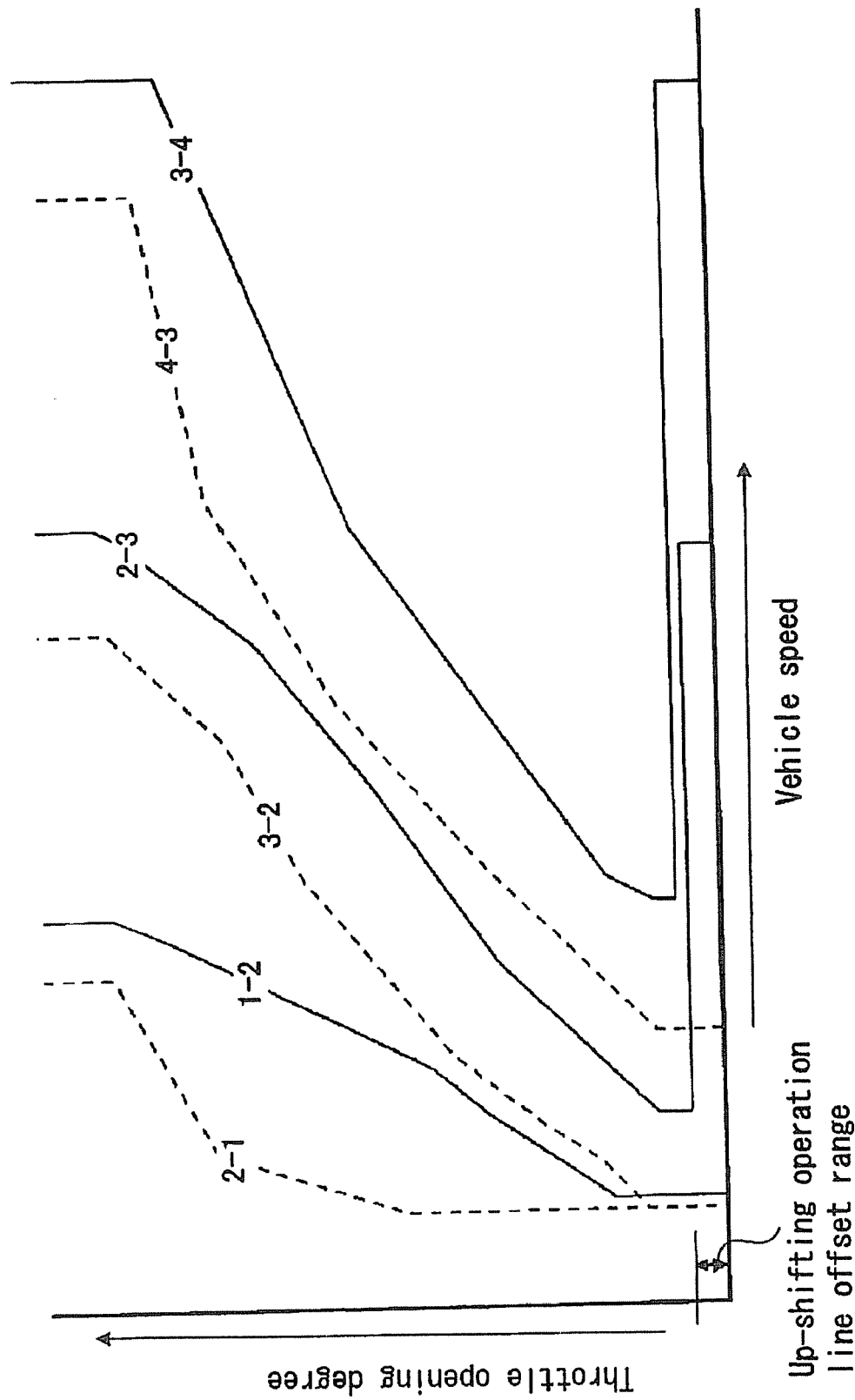
FIG. 3 illustrates a speed shift stage selecting map B provided at the control apparatus for the transmission, according to the embodiment.
Figure 4:
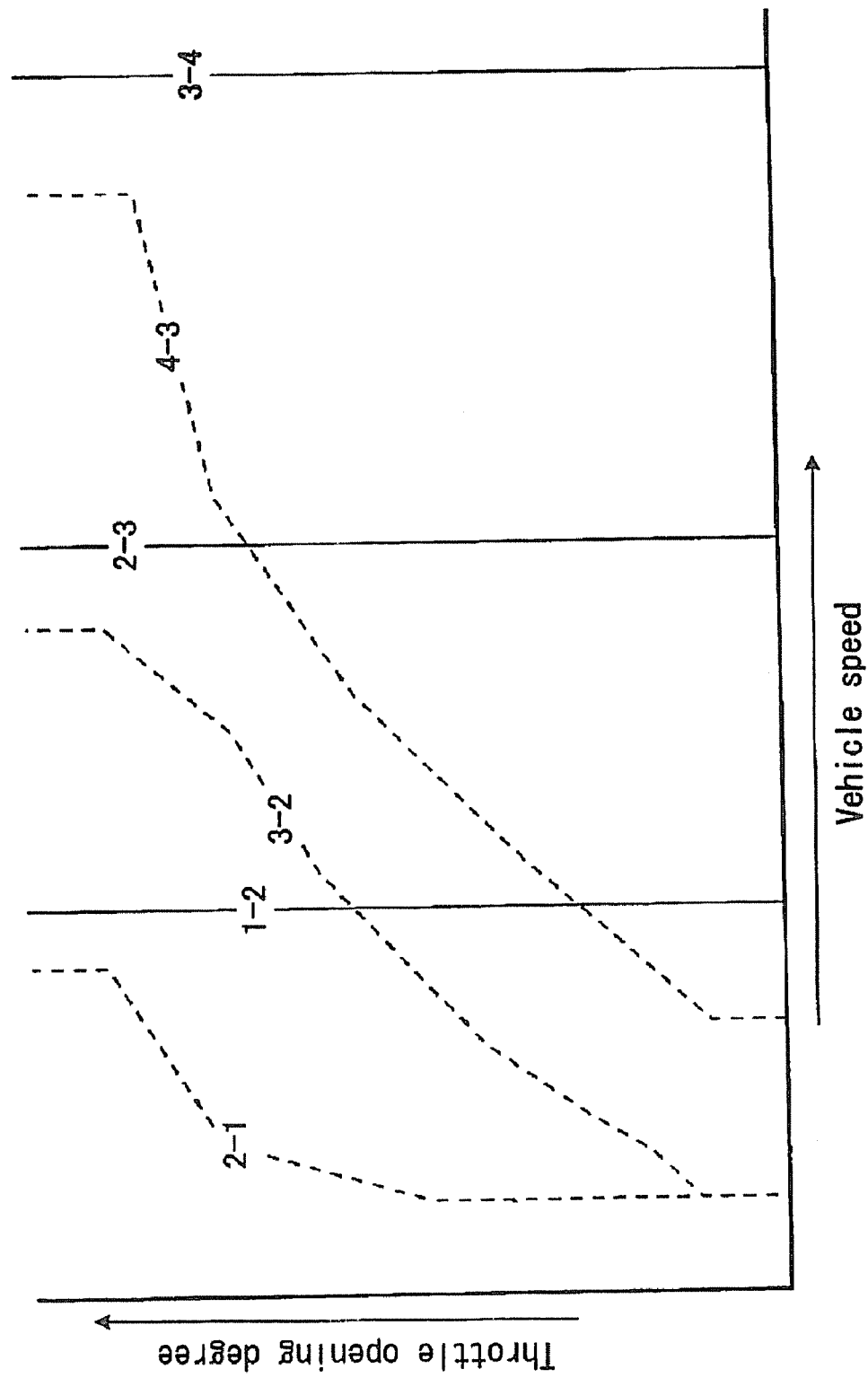
FIG. 4 illustrates a speed shift stage selecting map A provided at the control apparatus for the transmission, according to the embodiment.
Figure 5:
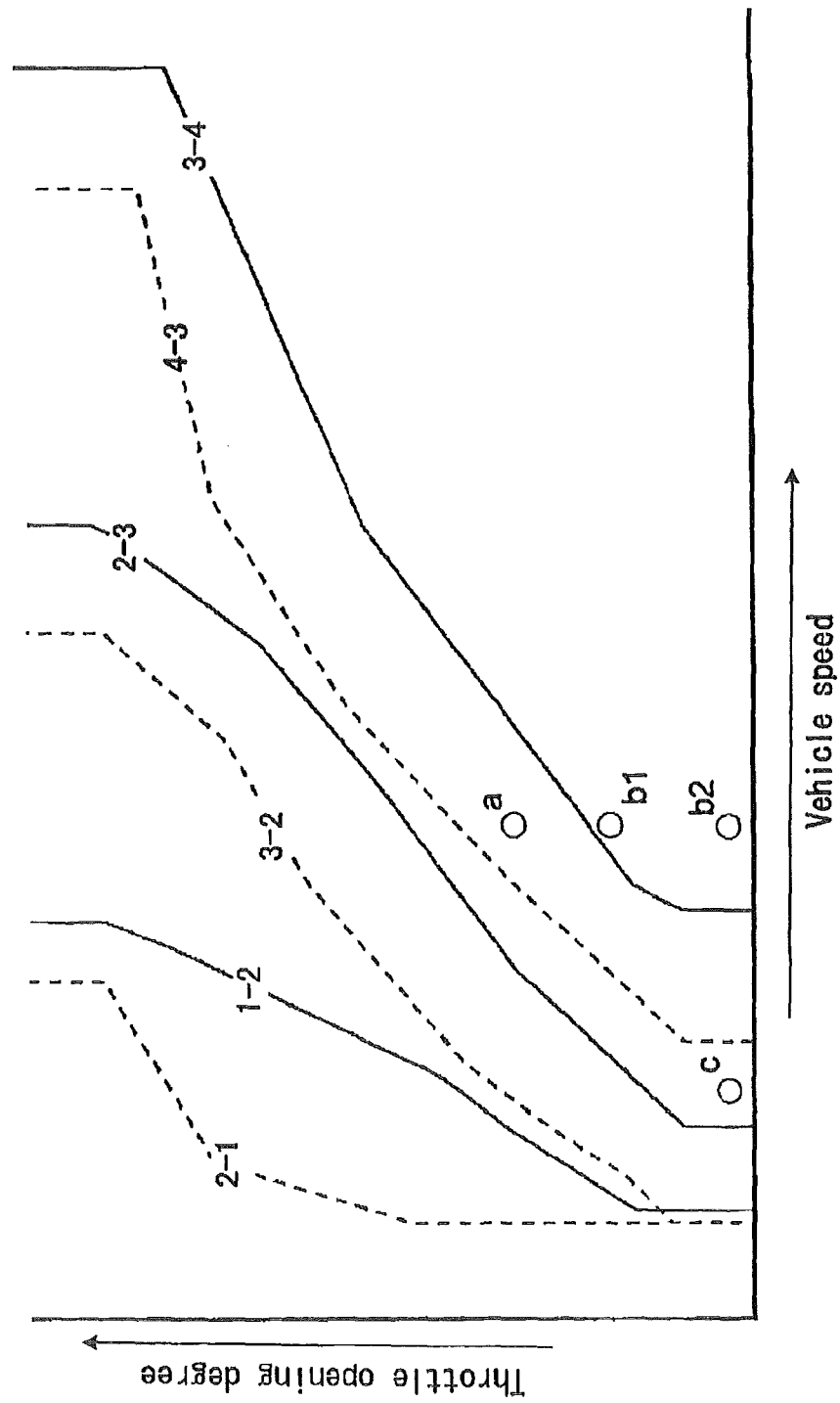
FIG. 5 illustrates an example of a speed shift stage selecting map, according to a known art.

When the vehicle speed is increased, the transmission control circuit 15 refers the speed shift stage selecting map B illustrated in FIG. 3 or the speed shift stage selecting map illustrated in FIG. 5 and determines that the up-shifting operation is required. Accordingly, the speed shift stage of the transmission 4 is changed.

An operation of a control apparatus for a transmission (automated transmission) according to the embodiment will be described hereinafter. The operation described hereinbelow is performed when the operator releases the accelerator pedal 17 under an accelerating state or a driving state of the vehicle in which the vehicle is driven at a constant speed where the accelerating pedal 17 is depressed by a constant degree.

<Outline of the control> The transmission control circuit 15 measures an accelerator pedal releasing speed (returning speed) when the operator of the vehicle releases the accelerator pedal 17, thereby predicting whether or not the operator intends to brake the vehicle on the basis of the degree of the accelerator pedal releasing speed. When the ECU 11 predicts that the operator intends to brake the vehicle, the transmission control circuit 15 restrains the up-shifting operation in response to the releasing operation of the accelerator pedal 17. Accordingly, the frequency of the speed changes is reduced. Herein, the transmission control circuit 15 serves as a releasing speed measuring unit for measuring the accelerator pedal releasing speed.

On the other hand, when the ECU 11 determines that the operator does not intend to brake the vehicle, the transmission control circuit 15 performs the up-shifting operation. Accordingly, a constant speed driving of the vehicle is realized by one of the speed shift stages, at which the fuel is efficiently consumed.

<Specific operation> According to the embodiment, the transmission control circuit 15 functions as the up-shifting operation allowing unit and the up-shifting operation restraining unit. As the up-shifting operation allowing unit, the transmission control circuit 15 determines whether or not the speed changing is required with reference to the speed shift stage selecting map B (see FIG. 3), which is used for conducting the up-shifting operation in response to the accelerator pedal releasing speed (returning speed) of the accelerator pedal 17. On the other hand, as the up-shifting operation restraining means, the transmission control circuit 15 determines whether or not the speed changing is required with reference to the speed shift stage selecting map A (see FIG. 4), which is used for restraining the up-shifting operation in response to the accelerator pedal releasing speed (returning speed) of the accelerator pedal 17.

Figure 2:
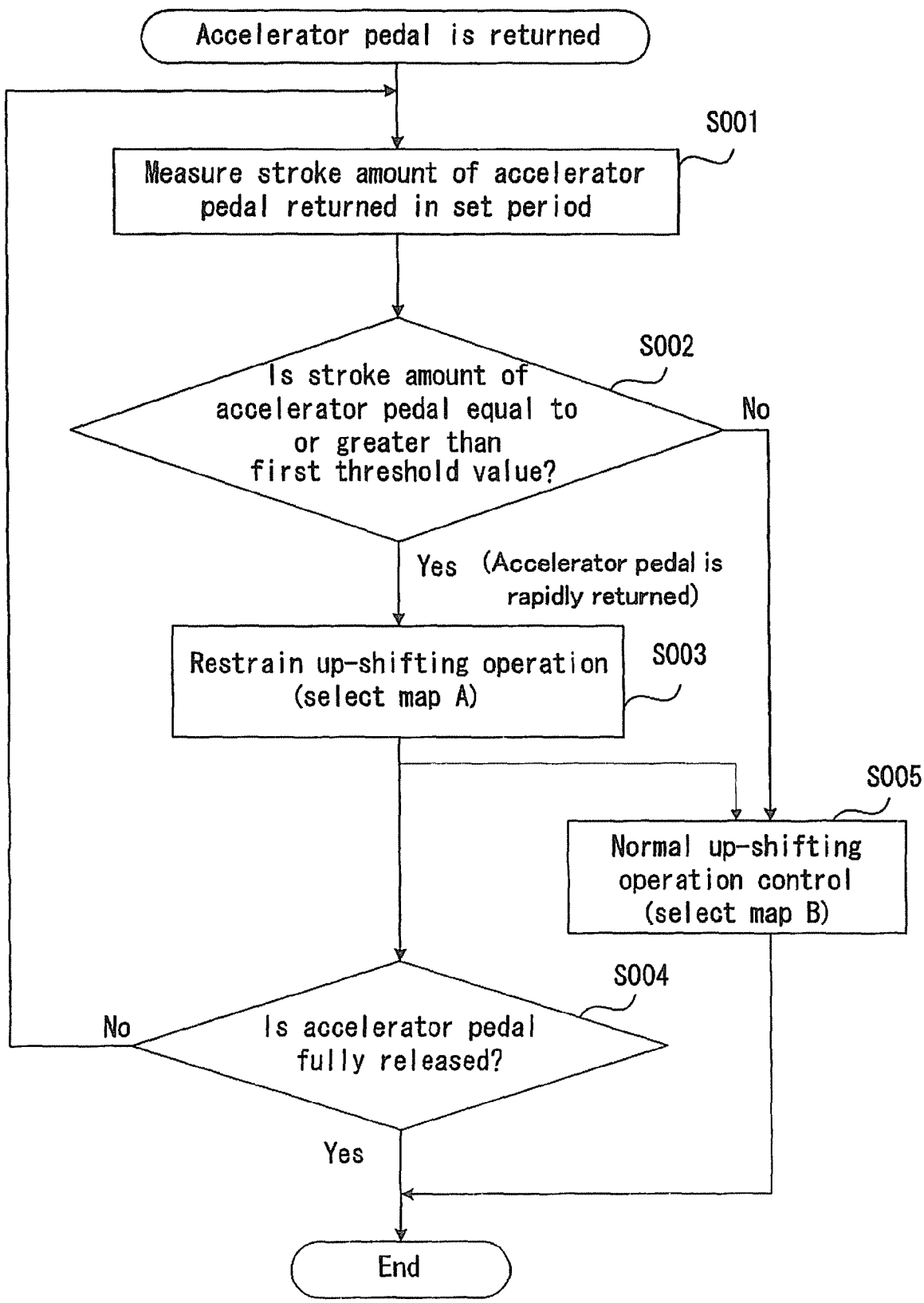
FIG. 2 is a flowchart illustrating an example of an operation of the control apparatus for the transmission, according to the embodiment.

The operation of the transmission control circuit 15 will be described hereinafter with reference to FIG. 2. First, when the release (return) of the accelerator pedal 17 is detected, the transmission control circuit 15 calculates a stroke amount of the accelerator pedal 17 which is returned in a predetermined period (a set period). Herein, the stroke amount (depressing amount) of the accelerator pedal 17 returned in the predetermined period (set period) corresponds to the accelerator pedal releasing speed.

In a condition where the stroke amount of the accelerator pedal 17 returned in the predetermined period is equal to or greater than a predetermined threshold value (serving as a first threshold value), i.e., in a condition where the accelerator pedal 17 is rapidly returned ("YES" in Step S002), the transmission control circuit 15 selects the speed shift stage selecting map A (FIG. 4) which is designed to restrain the up-shifting operation in response to the reduction of the throttle opening degree, and determines whether or not the speed changing is required with reference to the speed shift stage selecting map A (Step S003).

On the other hand, in a condition where the stroke amount of the accelerator pedal 17 returned in the predetermined period is lower than the predetermined threshold value ("NO" in Step S002), the transmission control circuit 15 selects the speed shift stage selecting map B (see FIG. 3) and determines whether or not the speed changing is required with reference to the speed shift stage selecting map B (Step S005).

In a condition where the stroke amount of the accelerator pedal 17 returned in the predetermined period is equal to or greater than the predetermined threshold value, the transmission control circuit 15 repeatedly performs the above controls until the accelerator pedal 17 is fully returned (fully released) i.e., the throttle is fully closed ("YES" in Step S004) or until the stroke amount of the accelerator pedal 17 returned in the predetermined period becomes lower than the predetermined threshold value ("NO" in Step S002).

More specifically, an interval (the predetermined period) for measuring the stroke amount of the accelerator pedal 17 is assigned to be 300 milliseconds, and the predetermined threshold value is assigned to be 4%. At this time, in a period where the transmission control circuit 15 detects that the stroke amount of the accelerator pedal 17 returned in the interval of 300 milliseconds is equal to or greater than 4%, the speed shift stage selecting map A is applied. At the moment where the stroke amount of the accelerator pedal 17 returned in the interval of 300 milliseconds becomes lower than 4% or when the accelerator pedal is fully released, the transmission control circuit 15 terminates the application of the speed shift stage selecting map A.

According to the speed shift stage selecting map B illustrated in FIG. 3, up-shifting operation lines at a range of low-throttle opening degree (i.e., at the range of 0 to a few percents), at which the accelerator pedal 17 is substantially completely released, are offset towards a high-speed range. More specifically, in FIG. 3, up-shifting operation lines at the range of low-throttle opening degree are designed to be approximately the same as those illustrated in the speed shift stage selecting map A in FIG. 4. Other features of the speed shift stage selecting map B (FIG. 3) are approximately the same as the speed shift stage selecting map illustrated in FIG. 5.

When the accelerator pedal 17 is fully released after the transmission control circuit 15 determines that the stroke amount of the accelerator pedal 17 returned in the predetermined period is large and the speed shift stage selecting map A is applied, the transmission control circuit 15 refers the speed shift stage selecting map B. According to the speed shift stage selecting map illustrated in FIG. 5, the transmission control circuit 15 easily determines that the up-shifting operation is required at the range of the low-throttle opening degree. On the other hand, according the speed shift stage selecting map B, the up-shifting operation lines at the range of the low-throttle opening degree are largely offset towards the high-speed range. Therefore, even when the transmission control circuit 15 shifts the application of the speed shift stage selecting map A to the application of the speed shift stage selecting map B, the transmission control circuit 15 hardly determines that the up-shifting operation is required at the low-throttle opening degree. Thus, the transmission control circuit 15 restrains the up-shifting operation in an accelerator pedal released state, in which an accelerator pedal depressing amount is lower than a set value (at the range of low-throttle opening degree corresponding to an up-shifting operation line offset range in FIG. 3), with reference to the speed shift stage selecting map B.

Being different from the speed shift stage selecting map illustrated in FIG. 5, the speed shift stage selecting map A (FIG. 4) includes up-shift speed changing lines, which are vertically lined in a direction of the throttle opening degree axis and with which the transmission control circuit 15 does not determine the requirement of the up-shifting operation due to the reduction of the throttle opening degree. When the transmission control circuit 15 determines that the stroke amount of the accelerator pedal 17 returned in the predetermined period is large, the transmission control circuit 15 determines to perform only the downshift operation with reference to the speed shift stage selecting map A (FIG. 4) and shifts to control (an operation mode) to maintain the current speed stage, at which the vehicle is driven, regardless of the reduction of the throttle opening degree.

Thus, in the condition where the stroke amount of the accelerator pedal 17 returned in the predetermined period is equal to or greater than the predetermined threshold value, the transmission control circuit 15 restrains the up-shifting operation due to the reduction of the throttle opening degree. Accordingly, the frequency of the speed changes, which may be performed when the accelerator pedal 17 is radically released, is reduced, so that the electricity regenerated at the electric generator 2 while the accelerator pedal is rapidly released is increased.

Further, in a condition where the transmission control circuit 15 determines that the stroke amount of the accelerator pedal 17 returned in the predetermined period is large thereby applying the speed shift stage selecting map A (FIG. 4) and then the accelerator pedal 17 is restrained from being moved so that the reduction of the throttle opening degree is stopped, the speed shift stage selecting map B is applied in Step S002. Accordingly, a speed changing control, which does not restrain the up-shifting operation and by which an adequate fuel consumption and driving performance of the vehicle are assured, is executed.

The present invention is not to be construed as limited by the embodiment described above. Accordingly, variations, changes and equivalents which fall within the sprit and scope of the present invention, may be embraced thereby. For example, the speed shift stage selecting map illustrated in each of FIGS. 3 and 4 may be appropriately changed in association with a controlling parameter and the structure of the vehicle.

According to the embodiment described above, the stroke amount of the accelerator pedal 17 returned in the predetermined period is compared with the predetermined threshold value. The threshold value may be changed in association with the opening degree of the accelerator pedal, the vehicle speed, the speed shift stage, and the like, which are obtained when the releasing speed of the accelerator pedal is started to be measured.

Further, the predetermined threshold value (the first threshold value) may be determined to be smaller in association with a decrease of the accelerator pedal 17 depressing amount obtained when the releasing speed of the accelerator pedal 17 is measured. In other words, when the opening degree of the accelerator pedal 17 is higher, the transmission control circuit 15 may compare the releasing speed of the accelerator pedal 17 with the lower threshold value so as to determine the requirement of the up-shifting operation.

Further according to the embodiment, the speed shift stage is selected with reference to the speed shift stage selecting maps A and B (FIGS. 4 and 3) at the moment where the control apparatus detects that the accelerator pedal is returned (released). However, other speed shift stage selecting maps, which are different from those illustrated in FIGS. 3 and 4, may be employed for other vehicle conditions.

For example, the same downshift speed changing lines illustrated in FIG. 5 are employed in FIG. 3. However, the downshift speed changing lines may be offset towards the high-speed range at the range of the low-throttle opening degree in the same manner as the up-shift speed changing lines illustrated in FIG. 3. Accordingly, the downshift operation may be performed at an early time in accordance with the reduction of the vehicle speed, thereby increasing braking efficiency and the electricity regeneration.

Still further according to the embodiment, in the speed shift stage selecting map B which is applied when the releasing speed of the accelerator pedal 17 is low, the up-shift speed changing lines are offset towards the high-speed range at the range of the low-throttle opening degree. Therefore, the transmission control circuit 15 restrains the up-shifting operation immediately after the transmission control circuit 15 shifts the application of the speed shift stage selecting map A to the speed shift stage selecting map B in response to the fully releasing operation of the accelerator pedal 17. Alternatively, the transmission control circuit 15 may include a flag for prohibiting the up-shifting operation (up-shifting operation prohibiting flag). In a predetermined period (serving as a first set period) from a moment at which the application of the speed shift stage selecting map A is shifted to the application of the speed shift stage selecting map B (i.e., at which the releasing speed of the accelerator pedal 17 is reduced to be lower than the predetermined threshold value from a value equal to or greater than the first threshold value), the up-shifting operation prohibiting flag may be in an ON-state, thereby executing the up-shifting operation restraining control in association with the shift of the application of the speed shift stage selecting maps. At this time, the transmission control circuit 15 may confirm that the throttle opening degree is sufficiently low.

Due to the above described control apparatus for the transmission (the transmission control circuit 15), when the ECU determines that the operator intends to brake the vehicle on the basis of the degree of the accelerator releasing operation, the transmission control circuit 15 restrains the up-shift operation, which leads to an extra downshift operation. Therefore, the frequency of the speed changes in a condition where the accelerator releasing operation is performed while the vehicle travels is reduced, thereby improving the electricity regeneration.

Further according to the embodiment described above, the transmission control circuit 15 (the up-shifting operation allowing unit) restrains the up-shifting operation in the accelerator pedal released state in which the accelerator pedal depressing amount is lower than the set value.

Still further according to the embodiment described above, the transmission control circuit 15 restrains the up-shifting operation in the predetermined period (the first set period) from the moment at which the releasing speed of the accelerator pedal 17 is reduced to be lower than the predetermined threshold value (the first threshold value) from a value equal to or greater than the predetermined threshold value.

Still further, the predetermined threshold value is changed in association with the accelerator pedal depressing amount obtained when the releasing speed of the accelerator pedal 17 is measured.

Still further, the predetermined threshold value is determined to be smaller in accordance with the decrease of the accelerator pedal depressing amount obtained when the releasing speed of the accelerator pedal 17 is measured.

Still further, the predetermined threshold value is changed in association with the vehicle speed obtained when the releasing speed of the accelerator pedal 17 is started to be measured.

Still further, the predetermined threshold value is changed in association with a speed shift stage at which the vehicle travels when the releasing speed of the accelerator pedal is started to be measured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrainive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control apparatus of a transmission for a vehicle including an electric generator provided between an engine and the transmission and regenerating electricity when torque is transmitted from a drive shaft of the vehicle via the transmission in a braking condition, the control apparatus of the transmission, comprising:
   a releasing speed measuring unit for measuring a releasing speed of an accelerator pedal;
   an up-shifting operation allowing unit applied to allow an up-shifting operation under the accelerator pedal being released when a releasing speed of the accelerator pedal is lower than a first threshold value; and
   an up-shifting operation restraining unit applied to restrain the up-shifting operation under the accelerator pedal being released when the releasing speed of the accelerator pedal is equal to or greater than the first threshold value, wherein
   the up-shifting operation allowing unit restrains the up-shifting operation in a first set period from a moment at which the releasing speed of the accelerator pedal is reduced to be lower than the first threshold value from a value equal to or greater than the first threshold value.

2. A control apparatus for a transmission according to claim 1, wherein
   the up-shifting operation allowing unit restrains the up-shifting operation in an accelerator pedal released state in which an accelerator pedal depressing amount is lower than a set value.

3. A control apparatus of a transmission for a vehicle including an electric generator provided between an engine and the transmission and regenerating electricity when torque is transmitted from a drive shaft of the vehicle via the transmission in a braking condition, the control apparatus of the transmission, comprising:
   a releasing speed measuring unit for measuring a releasing speed of an accelerator pedal;
   an up-shifting operation allowing unit applied to allow an up-shifting operation under the accelerator pedal being released when a releasing speed of the accelerator pedal is lower than a first threshold value; and
   an up-shifting operation restraining unit applied to restrain the up-shifting operation under the accelerator pedal being released when the releasing speed of the accelerator pedal is equal to or greater than the first threshold value, wherein the first threshold value is changed in association with an accelerator pedal depressing amount obtained when the releasing speed of the accelerator pedal is measured.

4. A control apparatus for a transmission according to claim 3, wherein the first threshold value is determined to be smaller in accordance with a decrease of the accelerator pedal depressing amount obtained when the releasing speed of the accelerator pedal is measured.

5. A control apparatus for a transmission according to claim 1, wherein the first threshold value is changed in association with an accelerator pedal depressing amount obtained when the releasing speed of the accelerator pedal is measured.

6. A control apparatus for a transmission according to claim 2, wherein the first threshold value is changed in association with an accelerator pedal depressing amount obtained when the releasing speed of the accelerator pedal is measured.

7. A control apparatus for a transmission according to claim 5, wherein the first threshold value is determined to be smaller in accordance with a decrease of the accelerator pedal depressing amount obtained when the releasing speed of the accelerator pedal is measured.

8. A control apparatus for a transmission according to claim 6, wherein the first threshold value is determined to be smaller in accordance with a decrease of the accelerator pedal depressing amount obtained when the releasing speed of the accelerator pedal is measured.

9. A control apparatus for a transmission according to claim 2, wherein the first threshold value is changed in association with a vehicle speed obtained when the releasing speed of the accelerator pedal is started to be measured.

10. A control apparatus for a transmission according to claim 1, wherein the first threshold value is changed in association with a vehicle speed obtained when the releasing speed of the accelerator pedal is started to be measured.

11. A control apparatus for a transmission according to claim 3, wherein the first threshold value is changed in association with a vehicle speed obtained when the releasing speed of the accelerator pedal is started to be measured.

12. A control apparatus for a transmission according to claim 2, wherein the first threshold value is changed in association with a speed shift stage at which the vehicle travels when the releasing speed of the accelerator pedal is started to be measured.

13. A control apparatus for a transmission according to claim 1, wherein the first threshold value is changed in association with a speed shift stage at which the vehicle travels when the releasing speed of the accelerator pedal is started to be measured.

14. A control apparatus for a transmission according to claim 3, wherein the first threshold value is changed in association with a speed shift stage at which the vehicle travels when the releasing speed of the accelerator pedal is started to be measured.

\* \* \* \* \*